(No Model.)

M. AMS.
APPARATUS FOR SMOKING FISH OR MEAT.

No. 418,666. Patented Jan. 7, 1890.

WITNESSES
Wm N Lowe
Wm Wagner

INVENTOR
Max Ams
by his attorneys
Roeder & Briesen

UNITED STATES PATENT OFFICE.

MAX AMS, OF NEW YORK, N. Y.

APPARATUS FOR SMOKING FISH AND MEAT.

SPECIFICATION forming part of Letters Patent No. 418,666, dated January 7, 1890.

Application filed September 16, 1889. Serial No. 324,015. (No model.)

*To all whom it may concern:*

Be it known that I, MAX AMS, of New York city, New York, have invented an Improved Apparatus for Smoking Fish and Meat, of which the following is a specification.

This invention relates to an apparatus for smoking sturgeon and other fish and also for smoking meat.

The object of the invention is to provide a vessel that gives free access to the smoke, that permits the meat placed therein to be compressed, and that permits the meat to be readily removed after being smoked and compressed.

The invention consists in the various features of improvement, more fully pointed out in the claims.

Figure 4:
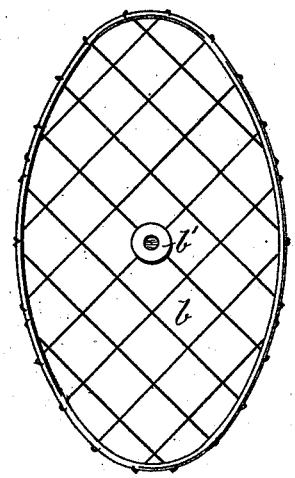
Figure 3:
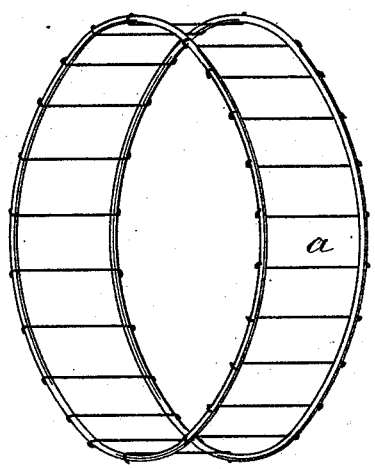
Figure 5:
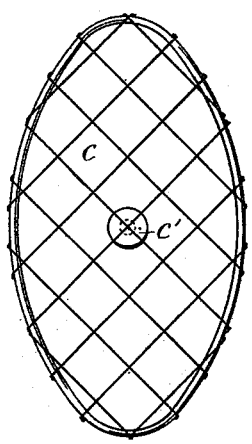
Figure 1:
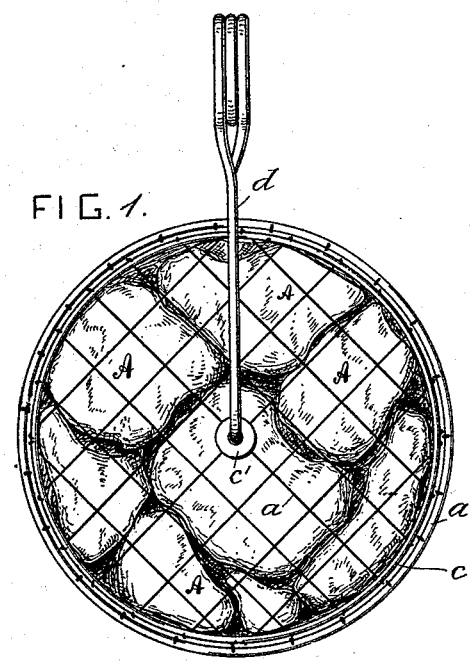
Figure 2:
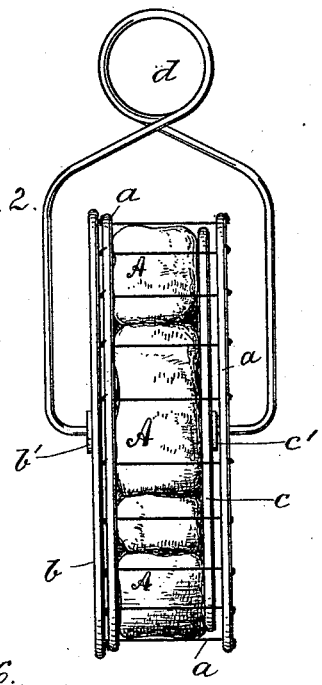
Figure 6:
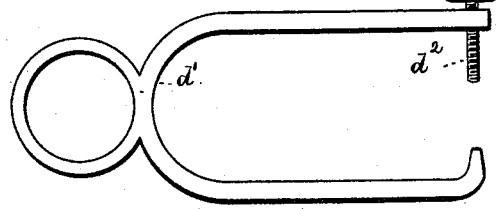

In the accompanying drawings, Figure 1 is a side elevation of my improved apparatus; Fig. 2, an end view thereof; Fig. 3, a perspective of the apparatus without the heads. Figs. 4 and 5 are perspective views of the outer and inner heads, respectively. Fig 6 is an elevation of a modification of the suspending-clasp.

The letter $a$ represents the body of a vessel or receptacle, open at both ends, and preferably of cylindrical form. It is made without any turned-in flanges at the edges and is composed, preferably, of a pair of end bands, to which the cross-bands are united. $b\ c$ are the two heads of the receptacle, disconnected from the body, so as to be entirely removable therefrom. Either the heads or the body, or both, must be composed of open-work, so that smoke can enter the interior of the vessel. The head $c$ should be made of a diameter to readily enter the body $a$, while the head $b$ is preferably made of a size to abut against the edge of the body, as shown. Both heads $b\ c$ are provided at the center with a solid portion or plate $b'\ c'$, as shown, against which bear the two arms of a spring-clasp $d$, that has a tendency to force the heads together.

The meat or fish A to be smoked is placed into the drum $a$ upon head $b$, after which the head $c$ is put in place. The entire apparatus is then suspended by the spring-clasp $d$ from a hook or other support in the smoking-room. While being subjected to the action of the smoke the meat or fish will be gradually compressed between the heads $b\ c$, to assume a flat or disk-like form that permits it to be readily packed into cans. Moreover, the drum can be readily revolved from time to time, and thus the juice that slowly settles at the bottom may be caused to run back through the meat. In this way the product will become uniformly smoked and will retain the juice. After the completion of the smoking process the fish or meat can be readily removed by first taking off both heads, when the contents of the drum will be free to drop out. Of course during the smoking and pressing process the fish or meat will at the surface be pressed into the interstices of the heads; but as the heads are both removable from the drum they can be readily torn off, after which there is nothing that prevents the fish or meat from dropping out. Were either of the heads permanently united to the drum, the contents, by adhering to it, as upon a fixed bottom, could not be removed without injury to such contents.

The drum and heads may be made of wire or any other suitable stiff material.

In Fig. 6 the spring-clasp $d$ is supplanted by a rigid clasp $d'$, having a set-screw $d^2$, which may be gradually tightened up. This construction is particularly applicable for smoking meat. The screw $d^2$ of the clasp $d'$ is in this construction the equivalent of the spring-arms of the clasp $d$.

What I claim is—

1. The combination of a flangeless receptacle $a$, open at both ends, with a pair of open-work heads disconnected from the receptacle and engaging opposite sides thereof, and with a clasp engaging the heads, substantially as specified.

2. The combination of a receptacle with a pair of open-work heads $b\ c$, having the solid plates $b'\ c'$, and with a clasp bearing against said plates, substantially as specified.

MAX AMS.

Witnesses:
F. V. BRIESEN,
WM. WAGNER.